(12) United States Patent
Geurts et al.

(10) Patent No.: US 6,778,098 B2
(45) Date of Patent: Aug. 17, 2004

(54) METHOD AND ELECTRONIC DEVICE FOR SPEECH CONTROL

(75) Inventors: Lucas Jacobus Franciscus Geurts, Eindhoven (NL); Paul Augustinus Peter Kaufholz, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 486 days.

(21) Appl. No.: 09/906,355

(22) Filed: Jul. 16, 2001

(65) Prior Publication Data

US 2002/0044068 A1 Apr. 18, 2002

(30) Foreign Application Priority Data

Jul. 21, 2000 (EP) ............................................ 00202644

(51) Int. Cl.[7] .................. G08C 19/00; G10K 11/00; G10L 21/00
(52) U.S. Cl. .................. 340/825.72; 340/5.84; 704/275; 367/197
(58) Field of Search ................ 367/199, 197; 340/825.72, 5.84; 704/245

(56) References Cited

U.S. PATENT DOCUMENTS

| | | | | |
|---|---|---|---|---|
| 5,777,571 A | * | 7/1998 | Chuang ................. | 341/176 |
| 6,119,088 A | * | 9/2000 | Ciluffo ................. | 704/275 |
| 6,219,645 B1 | | 4/2001 | Byers ................. | 704/275 |
| 6,606,280 B1 | * | 8/2003 | Knittel ................. | 367/198 |
| 6,629,077 B1 | * | 9/2003 | Arling et al. ......... | 704/275 |

FOREIGN PATENT DOCUMENTS

| | | | | |
|---|---|---|---|---|
| EP | 0612157 A2 | 8/1994 | ............ | H04B/1/20 |
| EP | 0772184 | 5/1997 | ............ | G10L/3/00 |
| EP | 0911808 | 4/1999 | ............ | G10L/5/06 |
| WO | WO9950826 | 10/1999 | ............ | G10L/3/00 |

OTHER PUBLICATIONS

Hua Jiang Zhenduo Han Scucces et al., "Voice–activated environmental control system for persons with disabilities," Aug. 4, 2000, pp. 167–168.

Patent Abstract of Japan Publ No. 10319991 A; "Method and Device for Voice Recognition Starting Electronic Equipment".

* cited by examiner

*Primary Examiner*—Michael Horabik
*Assistant Examiner*—Kimberly Hamilton
(74) *Attorney, Agent, or Firm*—John F. Vodopia

(57) ABSTRACT

Reliable and efficient activation and deactivation control of a number of electronic products (P1, P2, P3) is effected by activation of one of the products by emission of an activation command specific to the product and controlling performance and/or functionality of the product by speech commands. Emission of the activation command specific to the one product is accompanied by emission of a deactivation code causing deactivation of any other of the number of electronic products.

11 Claims, 2 Drawing Sheets

METHOD AND ELECTRONIC DEVICE FOR SPEECH CONTROL

Figure 1:
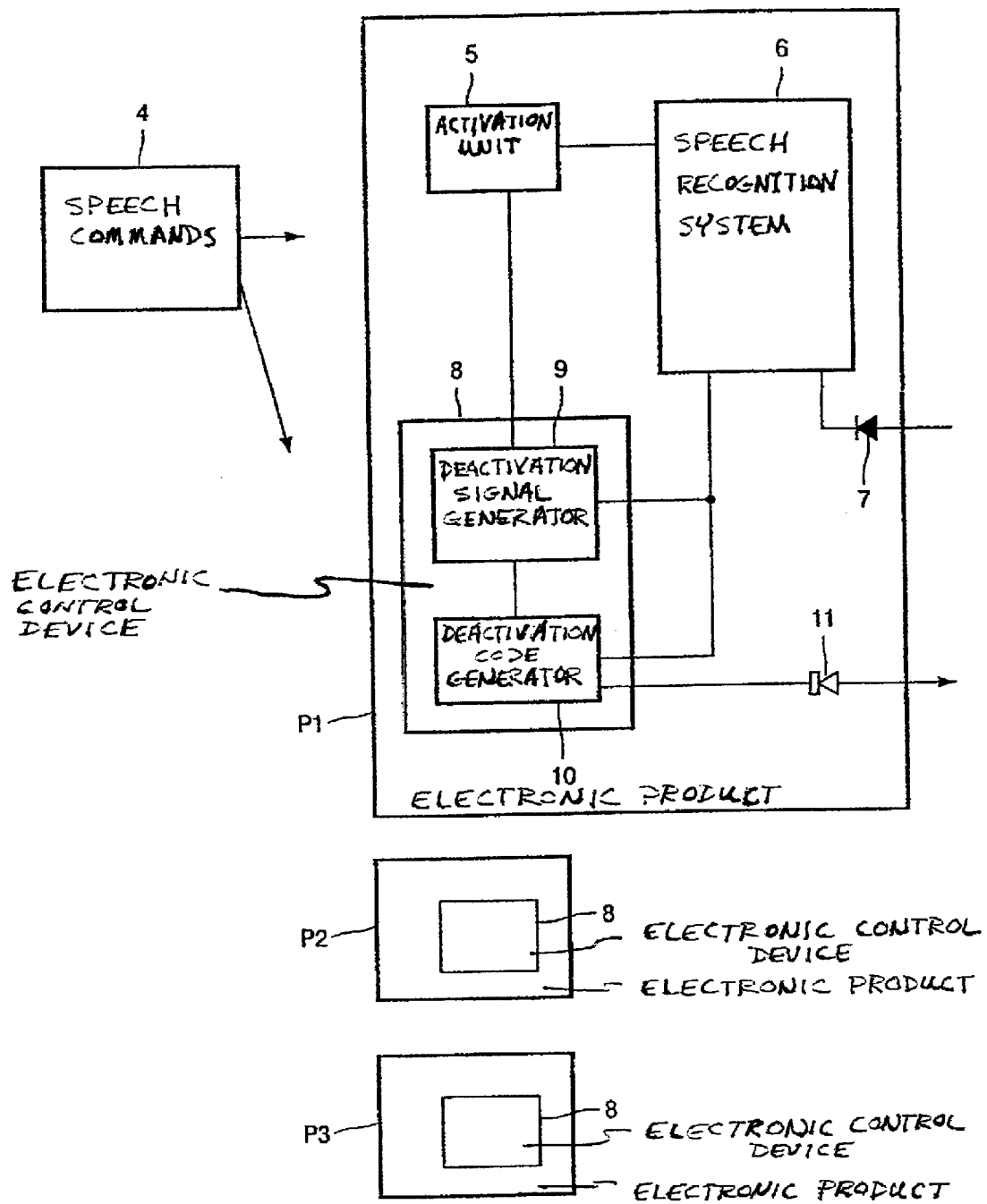

The present invention relates to a method for activation, deactivation and speech control of a number of electronic products, comprising the steps of activation of one of said products by emission of an activation command specific to said product and controlling performance and/or functionality of said product by speech commands.

When speech control of functionality and performance of electronic products such as consumer electronics like a TV set, stereo equipment and similar devices is used to control more than one electronic product in the same room the problem is encountered that the controlled products, when operating in parallel may disturb each others performance, because more than one product reacts on the same speech command intended for the control of one product only.

From EP-A-0 772 184 a speech based man-machine communication system is known, in which a unique speech control of more than one controllable device provided with speech synthesis function is obtained by providing each device with its own unique voice pattern. In order to limit the proliferation of the expensive hardware and software for speech recognition, a preferred architecture of the system is suggested, in which all the controlled devices are linked via a bus, so that all requests from the user are handled by a central authority equipped with speech recognition. Although a cost reduction may be obtained by this architecture, the additional costs of a bus connection linking the devices and a central speech recognition authority are significant.

A similar concept with a number of consumer electronic products interlinked by a bus network and controlled by a single speech recognition device is disclosed in EP-A-0 911 808.

In addition to the cost factor, these prior art solutions will seriously limit the freedom of the user in his selection and purchase of home electronics, since all the interlinked devices must operate under a common communication protocol.

Therefore, it is an object of the invention to provide a significantly simplified and less expensive method for speech control of several electronic products, which in addition provides the user with more freedom in the selection and purchase of such products.

According to the invention, the method as defined is characterized in that emission of the activation command specific to said one product is accompanied by emission of a deactivation code causing deactivation of any other of said number of electronic products.

Thereby, a number of speech controlled electronic products in the same room, which need not be interlinked by a bus system or otherwise be aware of one another can be controlled in a simple manner.

The activation command may by itself preferably be emitted as a speech command. In this case activation commands specific to each of the electronic products can comprise individual names assigned individually to the number of electronic products.

Alternatively, the activation command may be emitted by wireless transmission, e.g. in the form a specific activation signal from a remote control unit common to the number of electronic products. Activation may also be effected in a more traditional way by operation of an activation key or button on the electronic product to be activated In a preferred implementation of the method the deactivation code is generic to all of said number of electronic products and is generated and emitted by any of the products in response to its identification of receipt of the activation command specific to that product.

In order to avoid use of a bus connection or other form of wiring to connect the electronic products the deactivation code may preferably be emitted either by wireless transmission, e.g. as a short sequence of beep tones with variable frequency, volume and/or duration or as a radio frequency code, or be transmitted as a data sequence via a home power cabling system supplying electric power to said number of electronic products.

For carrying out the method the invention further relates to an electronic device, which is individually assignable to any of said number of electronic products for communication with and control of activation means in said product in response to identification of an activation command identified as being specific to said electronic product.

According to the invention such an electronic device is characterized by means for receiving and identifying a deactivation code and communicating a control signal to said activation means in response to said deactivation code for disabling said activation means.

In a preferred embodiment the electronic device further comprises means for emission of a deactivation code generic to all of said number of electronic products in response to a control signal received from said activation means by identification of receipt of the activation command specific to the product, to which the electronic device is assigned.

Typically, the electronic device will be incorporated in any of the number of electronic products. It may also be designed, however, as an add-on unit, whereby a particular versatile structure is obtained providing users with the freedom of purchasing an electronic product as an individual speech controlled device, which can subsequently be upgraded for use according to the method of the invention by means of the add-on electronic device.

Figure 2:
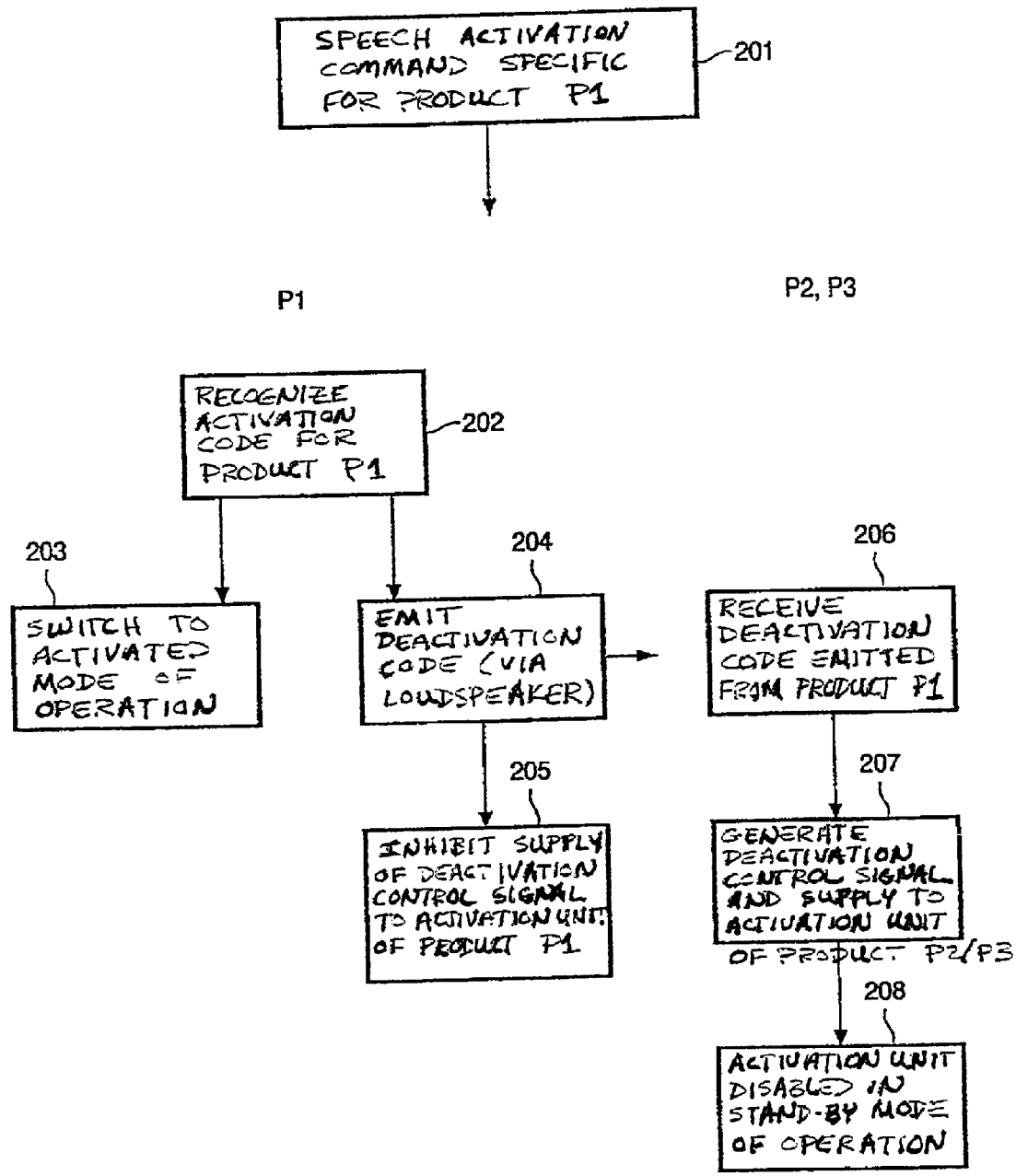

In the following, the invention will be further explained with reference to the accompanying drawings, in which FIG. 1 is a block diagram illustrating application of the method and electronic device of the invention to control of a number of home electronic products, and FIG. 2 is a flow diagram illustrating the method.

As illustrated by the example in FIG. 1 the functionality and performance of a number of home or consumer electronic products P1, P2 and P3 like a TV set, a stereo system, a DVD player etc. are controlled by voice control using specific speech commands 4 for the control of a multiplicity of functions in each product such as volume control, channel selection, image control of a TV monitor, switching between different modes of operation such as TV and text TV, functionality control of video or audio reproduction products etc.

In the illustrated example activation of any one of products P1 to P3 is effected by emission of a speech activation command assigned as a specific command for the product in question, e.g. in the form of a specific name assigned to each product.

Alternatively, activation may also be effected, however, by traditional operation of an activation key or button on the product to be activated or by means of wireless such as infra-red transmission from a remote control.

Each of products P1 to P3 comprises an activation unit 5, by means of which the product can be switched between an activated mode of operation, in which the product will respond to speech commands for control of its functionality and performance, and a stand-by mode, such speech commands being recognized in each product by a speech recognition system 6 having a recognition pattern comprising the activation command specific for the product and being connected with sound receiving means such as a microphone unit 7.

The activation unit 5 is connected with and controlled by an electronic device 8, which is also connected with the speech recognition system 6 and in the illustrated embodiment is incorporated as an integral part of each of products P1 to P3, but may also be designed as an add-on unit to a speech controlled product.

In the illustrated example the electronic device 8 in each of products P1 to P3 comprises a deactivation signal generator 9 for generating a deactivation control signal and supplying said signal to the activation unit 5 for switching said unit to the stand-by mode of operation as well as a deactivation code generator 10 for emission of a deactivation code, when the product itself has received an activation command.

The deactivation code generator 10 is connected with the speech recognition system 6 to receive an enabling signal therefrom, when a received speech command has been recognized or identified by the speech recognition system 6 as the activation command specific for the product. In response to this enabling signal the generator 10 generates the deactivation code, which in the illustrated example is generated as an audio frequency code and is supplied to a loudspeaker 11 connected with the generator 10.

Thereby or by other form of wireless transmission of the deactivation code, e.g. as a radio frequency signal, or by emission of the deactivation code as data sequence transmitted via he home power cabling system supplying the electronic products P1 to P3 with electric power, the use of a data bus or other form of separate wired connection between the electronic products is avoided In the illustrated example with a deactivation code in the form of a sequence of audio frequency beep tones the deactivation signal generator 9 is connected with the microphone unit 7 to receive therefrom the audio frequency deactivation code emitted by one of the other electronic products. In response to receipt and recognition or identification of such a deactivation code the generator 9 generates the deactivation control signal, which is supplied to the activation unit 5 to disable this unit from activation.

The deactivation signal generator 9 is further connected with the deactivation code generator 10 to receive therefrom a control signal inhibiting the supply of the deactivation control signal in response to emission of the deactivation code by the generator 10.

The operation of the method and the electronic device 8 in each of products 1 to 3 is illustrated by the flow diagram in FIG. 2.

By emission of a speech activation command 201 specific for product P1 the deactivation code is recognized 202 in the speech recognition system 6 in this product and from the speech recognition system 6 an activation control signal is supplied to the activation unit 5 in product P1, on one hand, whereby product P1 at step 203 is switched to the activated mode of operation, whereas an enabling signal is supplied to the deactivation code generator for emission 204 of the deactivation code via the loudspeaker 11. In response to this emission, at step 205 a control signal is further supplied from the deactivation code generator to the deactivation signal generator 9 for inhibiting supply of a deactivation control signal there from to the activation unit 5.

In each of products P2 and P3 the deactivation code emitted from product P1, in the illustrated example as an audio frequency code is received at step 206 by the microphone unit 7, which transfers the deactivation code to the deactivation signal generator 9, which thereby at 207 generates the deactivation control signal which is supplied to the activation unit 5, which is thereby disabled and caused to stay in the stand-by mode of operation in step 208.

As will appear from the foregoing a simple and cost-effective activation control of a number of speech controlled electronic products is provided by the invention to ensure in a reliable and efficient way that only one product at a time is activated to respond to speech commands for the control of functionality and performance of that product, whereas other electronic products within the range of operation of an emitted activation commands, e.g. located in the same room will be safely inhibited from activation until possible emission of the activation command specific to any of the other products.

The method is practiced by a relatively simple electronic at moderate costs, which can be incorporated as an integral component of each of the electronic products or be designed as an add-on unit.

The installation is simplified by avoiding the need for linking the electronic products by a network or bus or other form of separate wiring connection.

Some or all features as discussed above may alternatively be realized as software modules or objects.

What is claimed is:

1. A method for activation, deactivation and speech control of a number of electronic products (P1, P2, P3), comprising the steps of activation of one of said products by emission of an activation command specific to said product and controlling performance and/or functionality of said product by speech commands, wherein emission of the activation command specific to said one product is accompanied by emission of a deactivation code, the deactivation code for causing deactivation of any other of said number of electronic products (P1, P2, P3), further wherein the deactivation code is generic to all of said number of electronic products and is generated and emitted by any one of the products in response to its identification of receipt of the activation command specific to that product, the deactivation of said one product being blocked by said identification.

2. The method as claimed in claim 1, wherein the activation command is emitted as a speech command.

3. The method as claimed in claim 1, wherein the activation command is emitted by wireless transmission.

4. The method as claimed in claim 1, wherein the deactivation code is emitted by wireless transmission.

5. The method as claimed in claim 4, wherein the deactivation code is emitted as a short sequence of beep tones with variable frequency, volume and/or duration.

6. The method as claimed in claim 4, wherein the deactivation code is transmitted as a radio frequency code.

7. The method as claimed in claim 1, wherein the deactivation code is transmitted as a data sequence via a home power cabling system supplying electric power to said number of electronic products.

8. An electronic (8) device for carrying out a method as claimed in claim 1, said electronic device being individually assignable to any of said number of electronic products (P1, P2, P3) for communication with and control of activation means (5) in said product in response to identification of an activation command identified as being specific to said electronic product, said electronic device comprising means (7, 9) for receiving and identifying a deactivation code and communicating a control signal to said activation means (5) in response to said deactivation code for disabling said activation means.

9. The electronic device as claimed in claim 8, further comprising means (10, 11) for emission of a deactivation code generic to all of said number of electronic products (P1, P2, P3) in response to identification of receipt of the activation command specific to the product, to which the electronic device (8) is assigned.

10. The electronic device as claimed in claim 8, wherein said electronic device is incorporated in any of said number of electronic products (P1, P2, P3).

11. The electronic device as claimed in claim 8, wherein said electronic device comprises an add-on unit with respect to the electronic product, to which it is to be assigned and is connectable with the activation means (5) of said product.

* * * * *